(12) United States Patent
Wang et al.

(10) Patent No.: US 11,213,822 B2
(45) Date of Patent: Jan. 4, 2022

(54) LIGHT SOURCE ASSEMBLY AND MICRO TOTAL ANALYSIS SYSTEM

(71) Applicant: BOE TECHNOLOGY GROUP CO., LTD., Beijing (CN)

(72) Inventors: Fangzhou Wang, Beijing (CN); Xianqin Meng, Beijing (CN); Wei Wang, Beijing (CN); Jifeng Tan, Beijing (CN); Jian Gao, Beijing (CN); Xiandong Meng, Beijing (CN); Pengxia Liang, Beijing (CN); Qiuyu Ling, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 249 days.

(21) Appl. No.: 16/457,098

(22) Filed: Jun. 28, 2019

(65) Prior Publication Data

US 2020/0070158 A1 Mar. 5, 2020

(30) Foreign Application Priority Data

Aug. 28, 2018 (CN) .......................... 201810988118.8

(51) Int. Cl.
*B01L 3/00* (2006.01)
*G01N 21/59* (2006.01)

(52) U.S. Cl.
CPC ........ *B01L 3/502715* (2013.01); *G01N 21/59* (2013.01); *B01L 2300/0627* (2013.01);
(Continued)

(58) Field of Classification Search
CPC .. B01L 3/502715; B01L 3/5027; B01L 3/502; B01L 3/50; G01N 21/59; G01N 21/17
(Continued)

(56) References Cited

U.S. PATENT DOCUMENTS

| 2006/0036125 A1 | 2/2006 | Viswanathan et al. |
| 2006/0153045 A1 | 7/2006 | Lee et al. |

(Continued)

FOREIGN PATENT DOCUMENTS

| CN | 101174726 A | 5/2008 |
| CN | 101202419 A | 6/2008 |

(Continued)

OTHER PUBLICATIONS

The First Office Action dated May 26, 2020 corresponding to Chinese application No. 201810988118.8.
(Continued)

*Primary Examiner* — Christine T Mui
(74) *Attorney, Agent, or Firm* — Nath, Goldberg & Meyer; Joshua B. Goldberg

(57) ABSTRACT

The present disclosure provides a light source assembly including a light source and a bull's eye collimation structure disposed on a light exiting side of the light source and configured to collimate light beam emitted by the light source. The bull's eye collimation structure includes a metal layer including a sub-wavelength aperture and a plurality of annular recesses surrounding the sub-wavelength aperture, the plurality of annular recesses being arranged along a radial direction of the sub-wavelength aperture.

12 Claims, 3 Drawing Sheets

(52) U.S. Cl.
CPC . *B01L 2300/165* (2013.01); *B01L 2400/0427* (2013.01); *G01N 2201/0633* (2013.01); *G01N 2201/0635* (2013.01)

(58) Field of Classification Search
USPC ...................................................... 422/82.05
See application file for complete search history.

(56) References Cited

U.S. PATENT DOCUMENTS

| 2008/0174509 | A1 | 7/2008 | Williams |
| 2009/0050487 | A1 | 2/2009 | Fang et al. |
| 2010/0110430 | A1 | 5/2010 | Ebbesen et al. |
| 2014/0042606 | A1 | 2/2014 | Vo et al. |
| 2018/0108992 | A1 | 4/2018 | Chen et al. |
| 2020/0108387 | A1* | 4/2020 | Dong ................ B01L 3/502715 |

FOREIGN PATENT DOCUMENTS

| CN | 101359775 A | 2/2009 |
| CN | 101910935 A | 12/2010 |
| CN | 102169199 A | 8/2011 |
| CN | 103576228 A | 2/2014 |
| CN | 104090332 A | 10/2014 |
| CN | 106154381 A | 11/2016 |
| CN | 107607475 A | 1/2018 |

OTHER PUBLICATIONS

Zhang, et al. "Realization of Enhanced Light Directional Beaming Via a Concentric Ring Structure Composited with Circular Disk and Conical Tip"; vol. 11, No. 6; Dec. 2014.

Chen, Xiu-wu "The effects of embedded groove on the resonance transmittance properties of metallic subwavelength shlit"; Journal of Northwest Normal University (Natural Science); vol. 54, No. 1; 2018.

Oliner, A.A., et al. "A Theory for the Dramatic Enhancement of Optical Transmission through a Subwavelength Hole and the Radiation of a Sharply Directive Beam from it"; 2004.

Lezec, H.J., et al. "Beaming Light from a Subwavelength Aperture"; Science, 297, 820; 2002.

Lin, D.Z., et al. "Beaming light from a subwavelength metal slit surrounded by dielectric surface gratings"; Optics Express; vol. 14, No. 8; Apr. 17, 2006.

Tuccio, et al. "Direct determination of the resonance properties of metallic conical nanoantennas"; Optics Letters; vol. 39, No. 3; Feb. 1, 2014.

Thio, et al. "Enhanced Light Transmission Through a Single Subwavelength Aperture" Optics Letters; vol. 26, No. 24; Dec. 15, 2001.

Zhu, et al. "Nanostructured Metal-Enhanced Raman Spectroscopy for DNA Base Detection"; IEEE Photonics Journal; vol. 4, No. 5; Oct. 2012.

Chen, et al. "Near-Field-Resonance-Enhanced Plasmonic Light Beaming"; IEEE Photonics Journal; vol. 2, No. 1; Feb. 2010.

Rui, et al. "Plasmonic near-field probe using the combination of concentric rings and conical tip under radial polarization illumination"; Journal of Optics; 2010.

Zhang, et al. "Realization of enhanced light directional beaming via a Bull's eye structure composited with circular disk and conical tip"; Optics Communications; 2015.

Yang, et al. "Split Bull's Eye Antenna for High-Speed Photodetector in the Range of Visible to Mid-Infrared"; IEEE Photonics Technology Letters; vol. 28, No. 11; Jun. 1, 2016.

Martin-Moreno, L., et al. "Theory of Highly Directional Emission from a Single Subwavelength Aperture Surrounded by Surface Corrugations" ;Physical Review Letters; vol. 90, No. 16; Apr. 25, 2003.

* cited by examiner

A-A

LIGHT SOURCE ASSEMBLY AND MICRO TOTAL ANALYSIS SYSTEM

CROSS-REFERENCE TO RELATED APPLICATION

This application claims priority to Chinese Patent Application No. 201810988118.8, filed on Aug. 28, 2018, the contents of which are incorporated herein in their entirety by reference.

TECHNICAL FIELD

The present disclosure relates to the field of micro-fluidic technology, and in particular, relates to a light source assembly and a micro total analysis system.

BACKGROUND

Micro total analysis system is developed to integrate basic operation units involved in the biochemical field, such as sample preparation unit, reaction unit, separation unit and detection unit, into a chip having a size of several square centimeters or less, in which the movement of micro fluidic particles is controlled to pass through the entire system by using micro-channels, so as to replace a conventional laboratory.

In the micro total analysis system, a micro-fluidic chip is configured to perform operations such as droplet transport, droplet separation and combination, and constitutes an integral test system together with a detecting structure, a light source and the like. In an existing micro total analysis system, the light source is independent of the micro-fluidic chip, which results in a complex structure of the micro total analysis system that is hardly to be carried. In addition, when using the micro total analysis system for droplet detection, it is necessary to detect the reactions of the droplet with light beams having different wave bands. However, existing light sources cannot split white light into light beams having different wave bands properly, resulting in an inaccurate detection result.

SUMMARY

In an aspect, the present disclosure provides a light source assembly including a light source and a bull's eye collimation structure disposed on a light exiting side of the light source and configured to collimate a light beam emitted by the light source. The bull's eye collimation structure includes a metal layer including a sub-wavelength aperture and a plurality of annular recesses surrounding the sub-wavelength aperture, the plurality of annular recesses being arranged along a radial direction of the sub-wavelength aperture.

According to an embodiment of the present disclosure, the sub-wavelength aperture is provided with a resonance structure including at least one tip portion having a first end on a sidewall of the sub-wavelength aperture and a second end pointing towards a center of the sub-wavelength aperture, and the second end of the tip portion has an acute angle.

According to an embodiment of the present disclosure, the resonance structure includes two tip portions which are opposite to each other.

According to an embodiment of the present disclosure, the sub-wavelength aperture has a diameter ranging from about 50 nm to about 500 nm.

According to an embodiment of the present disclosure, the light source assembly further includes a first substrate, and the bull's eye collimation structure is in the first substrate.

According to an embodiment of the present disclosure, a surface of the bull's eye collimation structure opposite to a light exiting surface of the bull's eye collimation structure is coplanar with an inner surface of the first substrate close to the light source.

According to an embodiment of the present disclosure, the annular recesses each has a circle annular shape and is concentric with the sub-wavelength aperture, and difference between inner diameters of adjacent two annular recesses is $4\pi/K_{spp}$, where $$K_{spp} = \frac{\omega}{c}\sqrt{\xi_d \xi_m/(\xi_d + \xi_m)},$$

$\omega$ represents angular frequency of an incident light beam, c represents light speed, $\xi_m$ represents dielectric constant of the metal layer, and $\xi_d$ represents dielectric constant of the first substrate.

According to an embodiment of the present disclosure, a distance between a center of the sub-wavelength aperture and a center of a grating ridge among grating ridges nearest to the sub-wavelength aperture is $2\pi/K_{spp}$, and the grating ridge is a protrusion between the annular recess and the sub-wavelength aperture.

According to an embodiment of the present disclosure, the light source assembly further includes an optical grating disposed on a side of the bull's eye collimation structure away from the light source and configured to split the collimated light beam according to a wavelength characteristic of light to allow light beams having different wave bands to exit in different directions.

According to an embodiment of the present disclosure, an orthographic projection of the optical grating on the first substrate overlaps an orthographic projection of the bull's eye collimation structure on the first substrate.

According to an embodiment of the present disclosure, the optical grating is a linear grating.

According to an embodiment of the present disclosure, the light source is a surface light source that emits white light.

In another aspect, the present disclosure further provides a micro total analysis system including a micro-fluidic device, a detecting device and the light source assembly described above, the micro-fluidic device being on a light exiting side of the light source assembly and configured to accommodate a liquid to be detected, the detecting device being in the micro-fluidic device and configured to detect information on light passing through the liquid to be detected.

According to an embodiment of the present disclosure, the micro-fluidic device includes a transport layer and a second substrate opposite to each other, the second substrate is on a side of the transport layer away from the light source assembly, a surface of the second substrate opposite to the transport layer and a surface of the transport layer opposite to the second substrate being each provided with a hydrophobic layer, and the detecting device is between the second substrate and the hydrophobic layer on the second substrate.

According to an embodiment of the present disclosure, the detecting device is in the hydrophobic layer on the second substrate.

BRIEF DESCRIPTION OF THE DRAWINGS

The accompanying drawings, which serve to provide a further understanding of the technical solutions of the present disclosure and constitute a part of this specification, are used for explaining the present disclosure together with the embodiments of the present disclosure, rather than limiting the present disclosure, in which.

DETAILED DESCRIPTION

The specific embodiments of present disclosure will be further described in detail below in conjunction with the accompanying drawings. It should be understood that the specific embodiments described herein are merely used for explaining and illustrating the present disclosure, rather than limiting the present disclosure.

Figure 1:
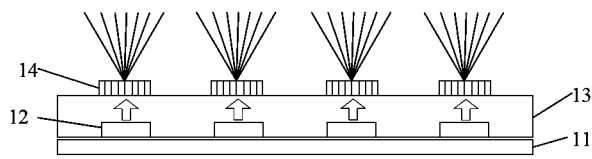
FIG. 1 is a schematic structural diagram of a light source assembly according to an embodiment of the present disclosure.
Figure 2:
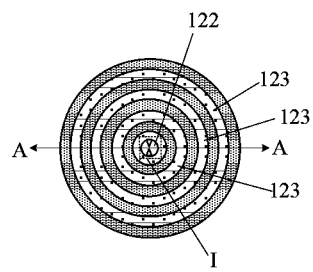
FIG. 2 is a plan view of a bull's eye collimation structure of FIG. 1.
Figure 3:
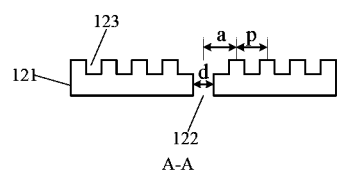
FIG. 3 is a cross-sectional view taken along line A-A of FIG. 2.
Figure 4:
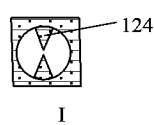
FIG. 4 is an enlarged view of an area "I" of FIG. 2.

FIG. 1 is a schematic structural diagram of a light source assembly according to an embodiment of the present disclosure. The light source assembly is used in a micro total analysis system. As shown in FIG. 1, the light source assembly 10 includes a light source 11 and a bull's eye collimation structure 12. For example, the light source 11 may be a surface light source which may emit white light. The bull's eye collimation structure 12 is disposed on a light exiting side of the light source 11 and configured to collimate light beam emitted by the light source 11, that is, after the light beam emitted by the light source 11 passes through the bull's eye collimation structure 12, the result light beam is a collimated light beam. FIG. 2 is a plan view of the bull's eye collimation structure of FIG. 1, FIG. 3 is a cross-sectional view taken along line A-A of FIG. 2, and FIG. 4 is an enlarged view of an area "I" of FIG. 2. As shown in FIGS. 2 to 4, the bull's eye collimation structure 12 includes a metal layer 121 provided thereon with a sub-wavelength aperture 122 and a plurality of annular recesses 123 surrounding the sub-wavelength aperture 122. The plurality of annular recesses 123 are arranged along a radial direction of the sub-wavelength aperture 122, thereby forming a metal micro/nano structure composed of the sub-wavelength aperture 122 and an annular grating surrounding the periphery thereof.

In a case where the light source assembly 10 is used in a micro total analysis system, the bull's eye collimation structure 12 can be used in conjunction with a beam splitting structure such as an optical grating. For example, the beam splitting structure may be provided between the bull's eye collimation structure 12 and the micro-fluidic device to split the collimated light beam emitted by the bull's eye collimation structure 12 in accordance with wavelength characteristic of light. Therefore, light rays having respective wave bands can be irradiated on the liquid in the micro-fluidic device along respective directions (i.e., light rays having a same wave band travels along a same direction), and information on the liquid can be determined according to information on the light rays having a respective wave band after passing through the liquid. Alternatively, the beam splitting structure may be on a side of the micro-fluidic device away from the bull's eye collimation structure 12, and the information on the light rays having the respective band and passing through the liquid can also be detected. Since the beam splitting structure is susceptible to the traveling direction of the incident light beam when it splits the incident light beam according to wavelength characteristic of light, diverging (i.e., non-collimated) incident light beam passing through the light splitting structure results in that the result light beam traveling in a direction may include light rays having different wave bands, which affects the detection result of the micro total analysis system. However, in the present disclosure, by having the light beam emitted by the light source 11 passing through the bull's eye collimation structure 12, a well collimated light beam can be obtained, thereby reducing the interference of the divergent incident light beam on the light splitting result of the light splitting structure, and improving the detection accuracy of the micro total analysis system. Moreover, since the bull's eye collimation structure 12 is a metal micro/nano structure composed of the sub-wavelength aperture 122 and the annular grating, the bull's eye collimation structure 12 is light and thin, which facilitates integration with the micro-fluidic device, thereby improving portability of the entire micro total analysis system.

It should be noted that each of the sub-wavelength aperture 122 and the annular recesses 123 in the bull's eye collimation structure 12 is a sub-wavelength structure. According to an embodiment of the present disclosure, the sub-wavelength aperture 122 has a diameter ranging from about 50 nm to about 500 nm.

As shown in FIG. 1, the light source assembly 10 further includes a first substrate 13. The bull's eye collimation structure 12 is in the first substrate 13. For example, the bull's eye collimation structure 12 is on an inner surface of the first substrate 13. For example, a surface of the bull's eye collimation structure 12 opposite to the light exiting surface thereof is coplanar with an inner surface of the first substrate 13 close to the light source 11. The light source 11 is on a side of the bull's eye collimation structure 12 away from the first substrate 13. According to an embodiment of the present disclosure, the first substrate 13 may be a glass substrate.

Figure 5:
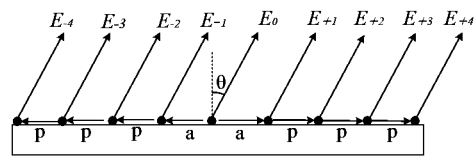
FIG. 5 is a schematic diagram showing the principle model of a bull's eye collimation structure.

FIG. 5 is a schematic diagram of the principle model of a bull's eye collimation structure. The principle that the bull's eye collimation structure 12 can achieve the convergence and collimation effects of the incident light beam passing through the structure is as follows.

When the light beam is emitted just towards the sub-wavelength aperture 122 from below the bull's eye collimation structure 12, part of the light beam will pass directly through the sub-wavelength aperture 122, which may be regard as light emitted by a point light source on the surface of the metal layer 121 and having energy of $E_0$. At the same time, another part of the light beam travels along the interface between the metal layer 121 and the first substrate in the form of surface plasmons polaritons (SPP).

The grating coupling condition is represented by the following formula (1).

$$K_x = K_0 \sin\theta \pm n\frac{2\pi}{P} = K_{spp} \quad (1)$$

In formula (1), p represents a grating period, that is, the distance between the centers of two adjacent grating ridges (here, the grating ridge is a protrusion between two adjacent annular recesses) in FIG. 3 or a half of the difference between the inner diameters of the two adjacent annular recesses 123, $K_x$ represents the wave number of the incident light beam passing through the sub-wavelength aperture 122 in the first substrate 13, $K_0$ sin θ represents a component of the wave number of the incident light beam $K_0$ on the interface between the metal layer 121 and the first substrate 13; $K_{spp}$ represents the wave number of the surface plasmons polaritons. When $K_{spp}$ is equal to $K_x$, resonance occurs, which can achieve convergence and collimation effects. In an embodiment, n is equal to 1 and the light source emits light beam towards the sub-wavelength aperture 122, the following formula (2) may be obtained.

$$p = \frac{2\pi}{K_{spp}} = \lambda_{spp} \quad (2)$$

In formula (2), $\lambda_{spp}$ represents wavelength of the surface plasmons polaritons.

In addition, when energy is transmitted to the grating ridges between adjacent annular recesses 123, the surface plasmons polaritons at the grating ridges may also be regarded as point sources which radiate energy (as shown by the dots in FIG. 5). The energy radiated by the point sources is $E_{(\pm 1)}$, $E_{(\pm 2)}$, $E_{(\pm 3)}$ . . . $E_{(\pm n)}$ respectively (the energy radiated at the right side of the sub-wavelength aperture 122 is represented by positive sign and the energy radiated at the left side of the sub-wavelength aperture 122 is represented by negative sign). Thus, angular distribution $E_{tot}(\theta)$ of the electric field in the far field can be expressed as constructive interference of light emitted by the point sources, which may be represented as the following formula (3).

$$Et_{tot}(\theta) = E_0 e^{-i\varphi_0} + q(\theta)E_{\pm 1} e^{-i\varphi_{\pm 1}} + q(\theta)E_{\pm 2} e^{-i\varphi_{\pm 2}} + q(\theta) E_{\pm 3} e^{-i\varphi_{\pm 3}} + \ldots q(\theta) E_{\pm n} e^{-i\varphi_{\pm n}} \quad (3)$$

where $E_0$ represents the energy of light passing directly through the sub-wavelength aperture 122 (i.e., as the energy of the light emitted by the point source on the surface of the metal layer 121), and q(θ) represents a proportional coefficient of the energy radiated by each point source. The phase $\varphi_{(\pm n)}$ of light radiated by the $n^{th}$ point source is represented as:

$$\varphi_{+n} = k_{spp}'[a+(n-1)p] - k_d[a+(n-1)p]\sin\theta$$

$$\varphi_{-n} = k_{spp}'[a+(n-1)p] + k_d[a+(n-1)p]\sin\theta \quad (4)$$

In formula (4), $k_d$ represents the wave number of the light emitted from the sub-wavelength aperture 122 in the first substrate 13, $k_{spp}'$ represents a real part of $K_{spp}$, and a represents the distance between the centers of the sub-wavelength aperture 122 and the grating ridge among the grating ridges nearest to the sub-wavelength aperture 122 in FIG. 3.

When $a=p=\lambda_{spp}$, the phase difference between the light emitted by the respective point sources is 2π, and the light each having exit angle of 0° are constructive interference to achieve the convergence and collimation effects.

$$K_{spp} = \omega/c\sqrt{\xi_d \xi_m/(\xi_d + \xi_m)},$$

ω represents angular frequency of the incident light beam (i.e., the angular frequency at the central wavelength of the incident light beam), c represents light speed, and $\xi_m$ represents dielectric constant of the metal layer 121, $\xi_d$ represents dielectric constant of the first substrate 13. Therefore, in order to achieve a good collimation effect, each annular recess 123 in the embodiment has a circle annular shape and is concentric with the sub-wavelength aperture 122. In addition, p is set as $2\pi/K_{spp}$ according to formula (2), that is, the difference between inner diameters of adjacent two annular recesses 123 is $4\pi/K_{spp}$. The distance between the center of the sub-wavelength aperture 122 and the center of the grating ridge nearest thereto is $2\pi/K_{spp}$.

According to an embodiment of the present disclosure, as shown in FIG. 4, a resonance structure is disposed in the sub-wavelength aperture 122 to further improve the collimation effect of the bull's eye collimation structure 12. The resonance structure includes at least one tip portion 124, the tip portion 124 has a first end on a sidewall of the sub-wavelength aperture 122, and a second end pointing towards a center of the sub-wavelength aperture 122, and the second end of the tip portion has an acute angle. The tip portion 124 is configured such that when light is emitted into the sub-wavelength aperture 122, a majority of the electrons are concentrated at the second end of the tip portion 124, thereby enhancing the energy of the light at the center of the sub-wavelength aperture 122 to cause resonance between the resonance structure and incident light. Therefore, the collimation effect of the bull's eye collimation 12 can be further enhanced.

According to an embodiment of the present disclosure, as shown in FIG. 4, the resonance structure includes two tip portions 124 which are opposite to each other, in order to further improve the collimation effect of the bull's eye collimation structure 12, and to ensure that sufficient light is emitted into the sub-wavelength aperture 122. It should be noted that the expression "two tip portions 124 which are opposite to each other" means that the angle bisectors of the second ends of the two tip portions 124 are at a same straight line or almost at a same straight line.

Figure 6:
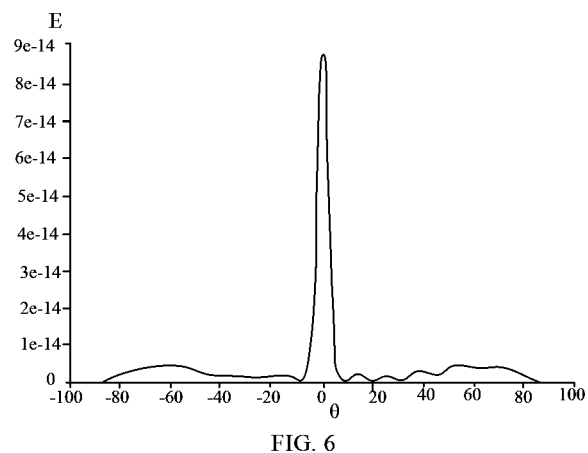
FIG. 6 is a diagram showing an exit angle of a light beam having wave band ranging from 430 nm to 450 nm with respect to the energy thereof when the light beam passes through a bull's eye collimation structure.

FIG. 6 is a diagram showing an exit angle of a light beam having wave band ranging from 430 nm to 450 nm with respect to the energy thereof when the light beam passes through a bull's eye collimation structure. It can be seen from FIG. 6 that the collimation degree of the light beam passing through the bull's eye collimation structure 12 is relatively excellent, which can reach ±2.5°.

Furthermore, the light source assembly 10 further includes an optical grating 14 disposed on a side of the bull's eye collimation structure 12 away from the light source 11 and configured to split the collimated light beam according to wavelength characteristic of light, such that light rays having different wave bands can be emitted along different directions and the light rays having the same wave band can be emitted along substantial the same direction.

In an embodiment, the optical grating 14 may be a linear grating with a grating equation as follows:

$$\frac{\sin\theta_1}{n_1} \pm \frac{\sin\theta_2}{n_2} = m\frac{\lambda}{p1},$$

Figure 7:
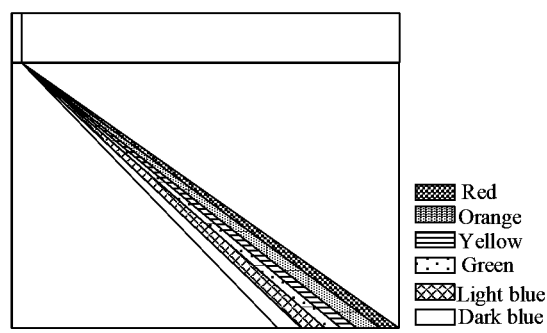
FIG. 7 shows a dispersion effect of an optical grating on a light beam passing through a bull's eye collimation structure.

-continued $$m = 0, \pm 1, \pm 2 \ldots$$

where $\theta_1$ and $\theta_2$ represent the incident angle and the exit angle respectively, $n_1$ and $n_2$ represent refractive indices of an incident medium and an exit medium respectively, $\lambda$ represents the wavelength of the incident light (i.e., central wavelength), m represents the order of the optical grating, and p1 represents grating period. It can be seen from the grating equation that the factors affecting the exit angle are the wavelength and the incident angle. When the incident angle is determined, the light rays having different wave bands have different exit angles and therefore are spatially separated. Therefore, in order to ensure that the light rays in an incident light beam having same wave bands have almost the same exit angle, a well collimated incident light beam is required. The bull's eye collimation structure 12 of the present disclosure can provide a well collimated light beam to the optical grating 14. FIG. 7 shows a dispersion effect of an optical grating on a light beam passing through a bull's eye collimation structure. In FIG. 7, light beams of different colors (i.e., light beams having different wave bands) are indicated by different hatchings.

It should be noted that the numbers of the optical grating 14 and the bull's eye collimation structure 12 are not limited in the present disclosure, as long as the position of the optical grating 14 corresponds to that of the bull's eye collimation structure 12. According to an embodiment of the present disclosure, an orthographic projection of the bull's eye collimation structure 12 on the first substrate 13 overlaps an orthographic projection of the optical grating 14 on the first substrate 13.

Figure 8:
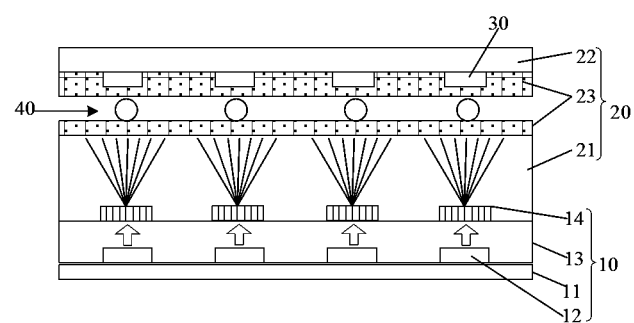
FIG. 8 is a schematic structural diagram of a micro total analysis system according to an embodiment of the present disclosure.

FIG. 8 is a schematic structural diagram of a micro total analysis system according to an embodiment of the present disclosure. As shown in FIG. 8, the micro total analysis system includes a micro-fluidic device 20, a detecting device 30, and the light source assembly 10 of the above embodiment. The micro-fluidic device 20 is disposed on a light exiting side of the light source assembly 10 and configured to accommodate a liquid 40 to be detected. The detecting device 30 is disposed on a side of the micro-fluidic device 20 away from the light source assembly 10 and configured to detect information on light passing through the liquid 40 to be detected, thereby obtaining information such as the concentration of a solute in the liquid 40 to be detected and chemical reaction state of the liquid 40 according to the information on the light. The information on the light may include information such as light intensity and brightness.

In an embodiment, as shown in FIG. 8, the micro-fluidic device 20 includes a transport layer 21 and a second substrate 22 disposed opposite to each other. The second substrate 22 is on a side of the transport layer 21 away from the light source assembly 10. A surface of the transport layer 21 opposite to the second substrate 22 and a surface of the second substrate 22 opposite to the transport layer 21 are each provided with a hydrophobic layer 23. The liquid 40 to be detected, which is accommodated in the micro-fluidic device 20, is between the two hydrophobic layers 23. The detecting device 30 is disposed between the second substrate 22 and the hydrophobic layer 23 on the second substrate 22. For example, the detecting device 30 may be disposed in the hydrophobic layer 23 on the second substrate 22.

According to an embodiment of the present disclosure, the micro-fluidic device 20 may be an electrowetting micro-fluidic device. In an embodiment, electrodes may be disposed on the transport layer 21 and the second substrate 22.

Electrical signals may be applied to the electrode on the transport layer 21 and the electrode on the substrate 22 to form an electric field that changes the contact angle of the droplets, causing the droplets to deform asymmetrically, thereby creating internal forces to drive the droplets.

The optical grating 14 may be disposed on the surface of the transport layer 21. For example, the optical grating 14 may be disposed in the transport layer 21 and on the inner surface of the transport layer 21. It can be understood that the range of light spot irradiated on the liquid 40 by the light beam having respective wave bands dispersed by the optical grating 14 is related to the thickness of the transport layer 21, and the larger the thickness of the transport layer 21, the larger the range of the light spot. Therefore, the thickness of the transport layer 21 can be set according to process parameters such as the detection accuracy of the detecting device to ensure that the detecting device 30 can detect the information on light having the respective wave bands.

In the micro total analysis system provided by the embodiment, the micro-fluidic device 20, the detecting device 30 and the light source assembly 10 are integrated together. Since the structure of the light source assembly 10 is light and thin, the micro total analysis system with high integration and light and thin properties can be obtained by integrating the detecting device 30, the micro-fluidic device 20 and the light source assembly 10, which results in the micro total analysis system more convenient to carry. Moreover, since the combination of the bull's eye collimation structure 12 with the optical grating 14 can cause the light beams of different colors to be dispersed properly, the detection result of the liquid 40 to be detected by the micro total analysis system including the light source assembly 10 is more accurate.

It can be understood that the above embodiments are merely exemplary embodiments used for illustrating the principle of the present disclosure, but the present disclosure is not limited thereto. For those skilled in the art, various modifications and improvements may be made without departing from the spirit and essence of the present disclosure, and these variations and improvements are also considered to be within the protection scope of the present disclosure.

The invention claimed is:

1. A light source assembly comprising:
   an area light configured to emit white light;
   a bull's eye collimation structure disposed on a light exiting side of the area light and configured to collimate a light beam emitted by the light; and
   an optical grating disposed on a side of the bull's eye collimation structure away from the area light and configured to split the light beam collimated by the bull's eye collimation structure according to a wavelength characteristic of light to allow light beams having different wave bands to exit in different directions,
   wherein
   the bull's eye collimation structure comprises a metal layer comprising a sub-wavelength aperture and a plurality of annular recesses surrounding the sub-wavelength aperture, the plurality of annular recesses being arranged along a radial direction of the sub-wavelength aperture, and
   the area light covers the bull's eye collimation structure and the optical grating, and an orthographic projection of the optical grating on the area light overlaps an orthographic project of the bull's eye collimation structure on the area light.

2. The light source assembly of claim 1, wherein the sub-wavelength aperture is provided with a resonance structure comprising at least one tip portion having a first end on a sidewall of the sub-wavelength aperture and a second end pointing towards a center of the sub-wavelength aperture, the second end of the tip portion having an acute angle.

3. The light source assembly of claim 2, wherein the resonance structure comprises two tip portions which are opposite to each other.

4. The light source assembly of claim 1, wherein the sub-wavelength aperture has a diameter ranging from about 50 nm to about 500 nm.

5. The light source assembly of claim 1, wherein the light source assembly further comprises a first substrate, and the bull's eye collimation structure is in the first substrate.

6. The light source assembly of claim 5, wherein a surface of the bull's eye collimation structure opposite to a light exiting surface of the bull's eye collimation structure is coplanar with an inner surface of the first substrate close to the area light.

7. The light source assembly of claim 5, wherein the annular recesses each has a circle annular shape and is concentric with the sub-wavelength aperture, and difference between inner diameters of adjacent two annular recesses is $4\pi/K_{spp}$, where $$K_{spp} = \frac{\omega}{c}\sqrt{\xi_d \xi_m / (\xi_d + \xi_m)},$$

$\omega$ represents angular frequency of an incident light beam, c represents light speed, $\xi_m$ represents dielectric constant of the metal layer, and $\xi_d$ represents dielectric constant of the first substrate.

8. The light source assembly of claim 7, wherein a distance between a center of the sub-wavelength aperture and a center of a grating ridge among grating ridges nearest to the sub-wavelength aperture is $2\pi/K_{spp}$, and the grating ridge is a protrusion between the annular recess and the sub-wavelength aperture.

9. The light source assembly of claim 1, wherein the optical grating is a linear grating.

10. A micro total analysis system comprising a micro-fluidic device, a detecting device and a light source assembly, wherein
the light source assembly is the light source assembly of claim 1,
the micro-fluidic device is on a light exiting side of the light source assembly and configured to accommodate a liquid to be detected, and
the detecting device is in the micro-fluidic device and configured to detect information on light passing through the liquid to be detected.

11. The micro total analysis system of claim 10, wherein the micro-fluidic device comprises a transport layer and a second substrate opposite to each other, the second substrate being on a side of the transport layer away from the light source assembly, a surface of the second substrate opposite to the transport layer and a surface of the transport layer opposite to the second substrate being each provided with a hydrophobic layer, and
the detecting device is between the second substrate and the hydrophobic layer on the second substrate.

12. The micro total analysis system of claim 4, wherein the detecting device is in the hydrophobic layer on the second substrate.

* * * * *